United States Patent [19]
Olbert et al.

[11] 3,853,653
[45] Dec. 10, 1974

[54] MANUFACTURE OF TIRES

[75] Inventors: Alois Olbert, Gelnhausen; Gerhard Mertens, Hanau am Main, both of Germany

[73] Assignee: Dunlop Limited, London, England

[22] Filed: Feb. 18, 1972

[21] Appl. No.: 227,573

[30] Foreign Application Priority Data
Feb. 24, 1971 Germany.............................. 2108781

[52] U.S. Cl............. 156/128 R, 156/132, 156/133, 156/398, 156/401, 156/416
[51] Int. Cl...................... B29h 17/16, B29h 17/26
[58] Field of Search .......... 156/131, 132, 135, 398, 156/400, 401, 402, 403, 128 I, 123, 133, 416, 417, 414, 415

[56] References Cited
UNITED STATES PATENTS

| | | | |
|---|---|---|---|
| 1,667,263 | 4/1928 | Mather .............................. | 156/133 |
| 2,910,109 | 10/1959 | Frohlich et al. ..................... | 156/416 |
| 2,986,196 | 5/1961 | Frazier.............................. | 156/416 |
| 3,016,084 | 1/1962 | Niclas et al. ........................ | 156/123 |
| 3,408,244 | 10/1968 | Frazier.............................. | 156/416 |
| 3,433,695 | 3/1969 | Caretta et al. ...................... | 156/401 |
| 3,475,254 | 10/1969 | Henley.............................. | 156/401 |
| 3,562,062 | 2/1971 | Bryant .............................. | 156/401 |

*Primary Examiner*—Clifton B. Cosby
*Attorney, Agent, or Firm*—Fitzpatrick, Cella, Harper & Scinto

[57] ABSTRACT

Method and apparatus for manufacture of radial ply tires. A hollow cylindrical carcass ply pocket is made up and the bead cores positioned thereon. The carcass ply region between the bead cores is then shaped into a toroid and the ply ends turned over the bead cores. During shaping the diameter of the carcass is restricted by an annular band which causes the sidewalls to bulge laterally. In this way the angle of the sidewalls can be made to approximate to that of the sidewalls in the finished tire on the rim while the ply ends are turned up about the bead cores and tacked down on the sidewalls. Distortion of the ply ends and lower sidewalls is thereby reduced,

14 Claims, 5 Drawing Figures

MANUFACTURE OF TIRES

The invention relates to a method and apparatus for building up a radial-ply tire, in which, after making up a hollow-cylindrical radial carcass ply pocket, the bead cores are positioned and then the carcass ply region situated between the bead cores is shaped into a toroid and the turning-over of the carcass ply ends about the bead cores is undertaken.

It is known to build-up a carcass on a so-called high-shoulder drum, the outer diameter of which is substantially greater than the diameter of the bead core rings. After completion of the carcass ply pocket, in the case of this method the carcass ply ends are firstly driven-in towards the axis of rotation of the drum. After positioning of the bead core rings on the radially driven-in carcass ply ends, those carcass ply portions which lie within the bead core rings are folded up about the bead core or the bead cores. In this connection, the height of the drum shoulder is designed in such a way that the ends of the carcass plies folded up around the bead core are on a smaller diameter than the outer diameter of the drum.

The most essential disadvantages of this known method consist in that, by virtue of the compressions and expansions occasioned by a change in diameter, it is difficult to maintain a uniform distribution of the reinforcements embedded in the carcass material and, moreover, only very elastic carcass materials can be used, so that the range of application of this known method is severely restricted.

Moreover, building-up methods are known in which, in a first building-up stage, a hollow-cylindrical radial carcass ply pocket is previously made up without bead cores. The positioning of the bead core rings, the shaping of the carcass ply region, situated between the bead core rings into a toroid shape and the subsequent folding-over of the lateral carcass ply ends about the bead cores is effected, in the case of this method, after conveyance of the radial carcass ply pocket from the first building-up stage to a second building-up stage. The breaker plies can, in this method be applied either individually after the carcass has been shaped into a toroid or the carcass may be shaped up into the interior of a breaker ply ring which is prepared at another location and which is positioned in the necessary manner in the second building-up stage.

In addition to the difficulty of keeping distortion slight during and after the folding-over of the carcass ply ends about the bead cores, in the case of all the known two-stage building-up processes there occurs the problem of achieving a cycle time which is as equal as possible in the first and the second building-up stage. This temporal co-ordination, extremely important in view of a rational and continuous flow of production, of the balancing of the two building-up stages cannot be achieved with the known method described in the aforegoing, since the cycle time of the first building-up stage is always less than that of the second build-up stage. It is obvious that this leads to difficulties in the flow of production.

The task of the invention is to provide a method for building-up radial-ply tires which makes it possible both when using elastic and relatively unresilient carcass material to reduce material displacements in the bead core region and in the neighboring sidewall zone during the building-up process and, moreover, in the case of a two-stage process, to achieve substantially the same cycle time in both stages.

According to the invention there is provided a method for building up a radial-ply tire comprising making up a hollow-cylindrical radial carcass ply pocket, positioning the bead cores and then shaping the carcass ply region situated between the bead cores into a toroid and turning-over the carcass ply ends about the bead cores wherein the shaping of the carcass ply region, situated between the bead cores, takes place with a simultaneous reduction in the mutual spacing of the bead cores, and radial expansion of the carcass is limited to a smaller diameter compared to its final diameter resulting in the production of lateral bulges in the carcass sidewalls, the carcass ply ends then being folded about the bead cores and fastened to the bulged-out carcass sidewalls prior to the removal of the diameter limitation on the carcass.

Preferably, the diameter limitation is selected as a function of the desired size of the acute angle between the bulged-out carcass sidewall and the ply end which is not folded over, and preferably also the length of the line which limits the cross-sectional area of the carcass torus lying in one plane with the axis of rotation of the carcass is the same, after abolition of the diameter limitation, as in the case of limited diameter and bulged out sidewall, i.e., no further extension of the carcass plies is necessary after removal of the diameter limitation.

Preferably, in the method in accordance with the invention, the spacing between the bead cores immediately prior to the folding-over of the carcass ply ends is selected to be substantially equal to the bead core spacing in the finished tire after mounting of the tire on a vehicle rim.

In this way, it is possible to form out the carcass line in the region of the bead cores in such a way that changes in angle and distortion of the plies during the folding-over and after the folding-over of the carcass ply ends about the bead cores in the further production cycle, is substantially eliminated both in the bead core region and in the neighbouring sidewall zones.

In the method of the invention the building-up of the radial-ply tire may be effected in a single-stage process and in this case the diameter limitation of the carcass toroid is abolished after the fastening of the carcass ply ends to the carcass sidewalls.

Alternatively, the building of the radial-ply tire may be effected in a two-stage process and the conveyance of the tire from the first to the second building stage undertaken after the folding-over and fastening of the carcass ply ends, in which case the diameter limitation of the carcass toroid is abolished only in the second building stage.

According to the invention also there is provided a method wherein the diameter limitation is selected as a function of the desired size of the acute angle between the bulged-out carcass sidewall and the carcass ply end which is not folded over.

The annular band preferably consists of at least two parts which can be coupled since, in this way, a particularly simple mounting and removing of the annular band is made possible.

The annular band is preferably provided on the outer circumference with retaining and/or centering members, particularly in the case of two-stage methods, since in this case the rigid annular band can be used both for conveying the carcass from the first build-up stage to the drum of the second build-up stage and for the positioning in the second build-up stage.

The axial width of the annular band is preferably somewhat less than the mutual spacing of the edges of the two folded-over carcass ply ends.

The device for the positioning of the bead cores advantageously consists of a bead supporting member having a groove to receive the bead, the diameter of which is variable approximately between the drum diameter and a greater diameter and which is displaceable in the axial direction relative to the build-up drum.

The device for the folding-over of the carcass ply ends advantageously consists of an inflatable bag, which is connected to the bead supporting member. This inflatable bag rests at least partly on a support region of the drum outer surface which support region is capable of being conically expanded. In this way, the bearing pressure of the folded-over carcass ply ends against the bulged-out lateral surface of the carcass sidewalls can be strengthened.

Further details of the invention are explained in more detail hereinunder with the aid of an exemplified embodiment and with reference to the drawings, in which.

Figure 1:
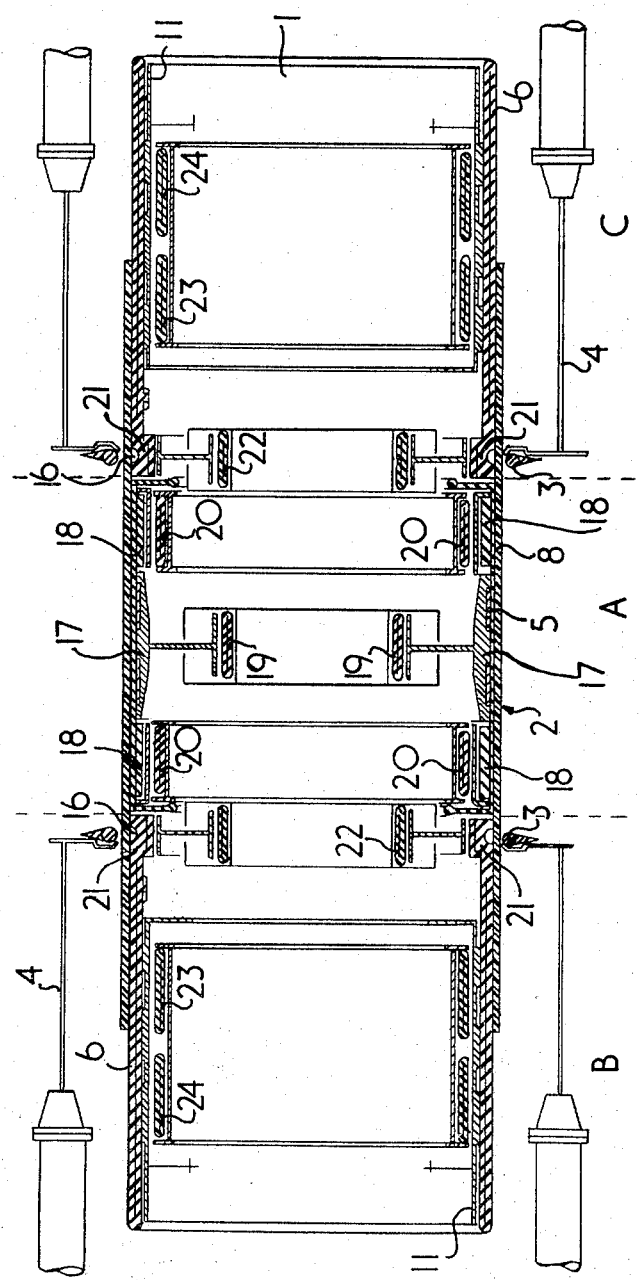
FIG. 1 shows a diagrammatic axial sectional view of a building drum for carrying out the method in accordance with the invention.

The building drum 1 consists of three sections, a central section A and side support sections B and C.

The central section A consists of radially movable crown supporting segments 17 and sidewall supporting segments 18 which are radially movable, similar to segments 17, but are also axially movable so as to be able to move in beneath the segments 17 when the latter are moved radially outwardly beyond them.

The movements of the segments 17 and 18 are controllable by inflatable bags 19 and 20 and the segments 17 and 18 are covered by an inflatable rubber diaphragm 5.

The side sections B and C each include a bead supporting member 21 having an annular groove 16 and being integral with an inflatable bag 6. The inflatable bag 6 is supported on a segmented support surface 11 which is movable between a cylindrical configuration and an expanded and tilted configuration in which the diameter of its end furthest from the central section is increased more than its other end.

The bead supporting member 21 is radially expandable by means of an inflatable bag 22 and the movements of the support surface 11 are controlled by inflatable bags 23 and 24. The whole of each side support section B and C of the drum is axially movable with the sidewall supporting segments 18.

Each of the inflatable bags 19, 22, 23 and 24 are associated with and positioned radially about a rigid ring inwardly of the segments to be moved so that when inflated expansion of the radially outer diameter of the bag takes place.

In addition to the building drum there are provided bead positioning devices 4 which are of known type to carry the beads 3 over the side portions of the drum into position over the bead supporting members 21. An annular band 7 of diameter greater than the expanded diameter of the segmental supports 17 and 18 is also provided together with means (not shown) to position the band concentrically about the crown supporting segments 17 of the drum 1.

In operation a hollow-cylindrical radial carcass ply pocket 2 is built up on the building drum 1. By means of the positioning devices 4, the bead core rings 3 are brought into the correct position in relation to annular grooves 16 in the bead supporting members 21 provided on the build-up drum 1.

Figure 2:
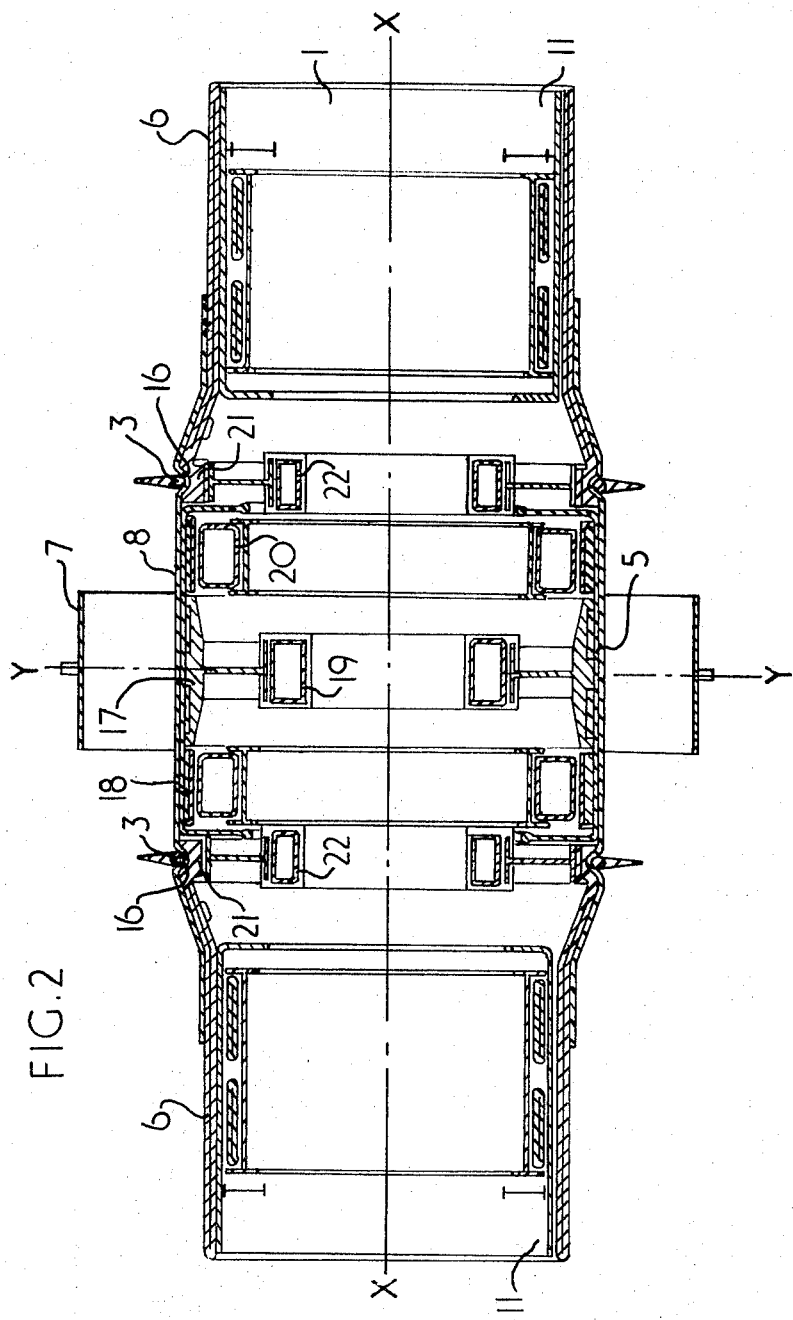
FIG. 2 shows a representation, corresponding to FIG. 1, of the building drum after positioning of the rings of bead cores.

FIG. 2 shows the building drum in the state in which the drum has been partly expanded and the bead cores 3 are definitely positioned in the groove 16. The building drum diameter is increased by inflation of the inflatable bags 19 20 and 22 and the bead cores 3 are held in the annular grooves 16 in the expanded bead supporting members 21.

Positioned concentrically to the central axis X,X of the building drum and symmetrically about the peripheral centre line Y,Y is a rigid annular band 7. The diameter of this ring is substantially smaller than that of the breaker plies that are to be applied later.

After the positioning of the bead cores 3 and of the annular band 7, the shaping of the carcass ply region 8, situated between the bead cores, can be effected. This shaping is achieved by inflation of the diaphragm 5 and simultaneous reduction in the mutual spacing of the bead cores, by axial movement of the side support sections B and C and the segments 18 of the central section towards the center line Y,Y. The segments 18 are returned radially inwardly to enable this to be done as shown in FIG. 3.

Figure 3:
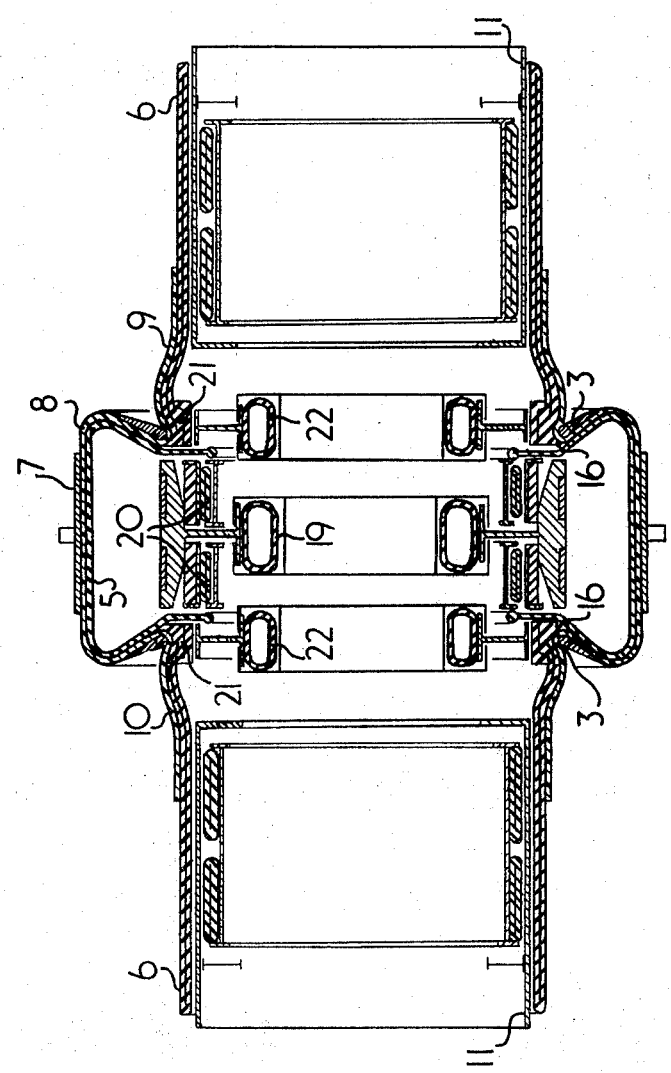
FIG. 3 shows a diagrammatic representation of the building drum according to FIG. 1 after shaping the carcass ply, situated between the bead cores, into toroid shape.

It can be seen from FIG. 3, which shows the final stage of the shaping of the carcass region 8, that the annular band 7 limits the radial expansion of the carcass to a diameter which is smaller than its final diameter. The result of this is that lateral bulges are produced in the carcass sidewall regions, since the diaphragm 5 must yield laterally by virtue of the radial limitation.

Figure 4:
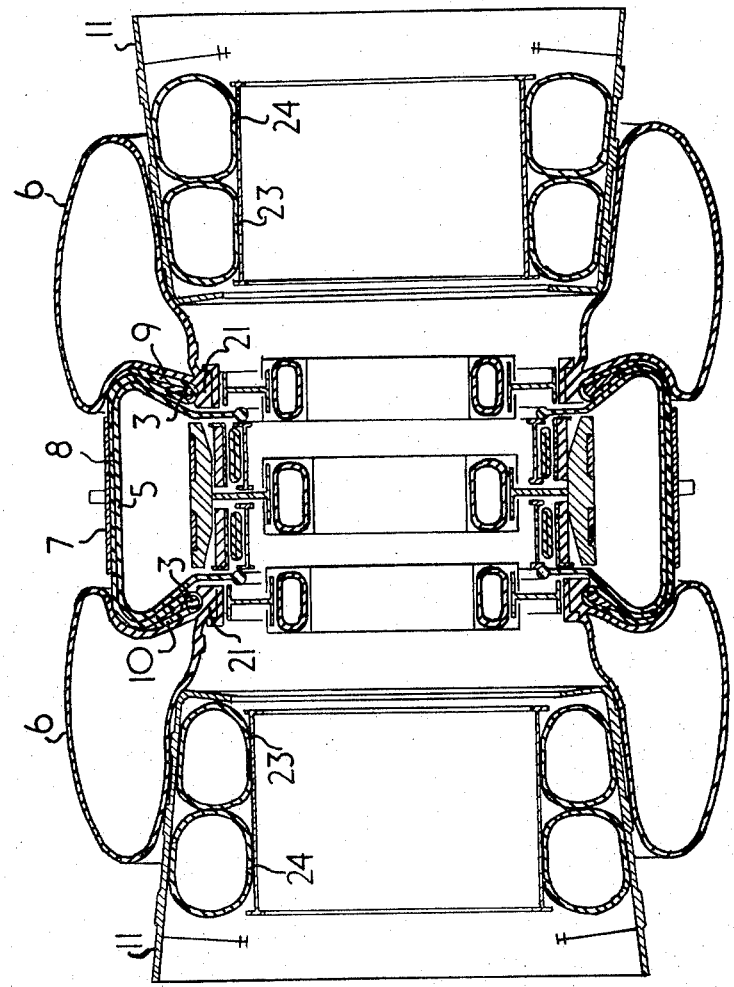
FIG. 4 shows a diagrammatic representation of the building drum in accordance with FIG. 1 during the fastening of the fold-over carcass ply ends to the sidewalls.

The size of the diameter of the annular band 7 is selected as a function of the desired size of the angle between the bulged-out carcass sidewalls and the carcass ply ends 9,10 that are not folded over which is preferably substantially the same as the angle of the sidewall with respect to the rim base in the finished tire. After having achieved the prescribed mutual bead core spacing, which can be the same as that in the finished tire when mounted on a vehicle rim, and after having obtained the desired angle between carcass sidewall and carcass ply end, these carcass ply ends 9,10 are folded about the bead cores, as shown in FIG. 4, and are brought into abutment against the carcass sidewalls. The folding-over of the carcass ply ends 9,10 is effected by inflating the bags 6 which rest at least partly on support surfaces 11 of the drum outer surface which are capable of being conically expanded, in order to be able to increase the pressure necessary for the fastening of the carcass ply ends to the carcass sidewalls.

A comparison of FIGS. 3 and 4 shows that the carcass ply ends 9,10 have to be moved, on account of the rigid annular band 7 provided in accordance with the invention, only through a relatively small angle, whereby, even in the case of relatively unresilient carcass material, the likelihood of distortion in the bead core region and in the neighbouring sidewall zones is greatly reduced. Since the spacing between the bead cores immediately prior to the folding-over process is advantageously selected to be the same bead core spacing of the tire on a wheel rim, virtually no angle changes, and therefore no distortion, will occur in the bead cores region after folding-over of the carcass ply ends has been effected.

Moreover, the use of the rigid annular band 7 has the advantage of stabilizing the partly shaped carcass during the folding-over of the lateral carcass ply ends about the bead cores, since displacement of the carcass in a direction parallel to the building drum is virtually precluded.

Figure 5:
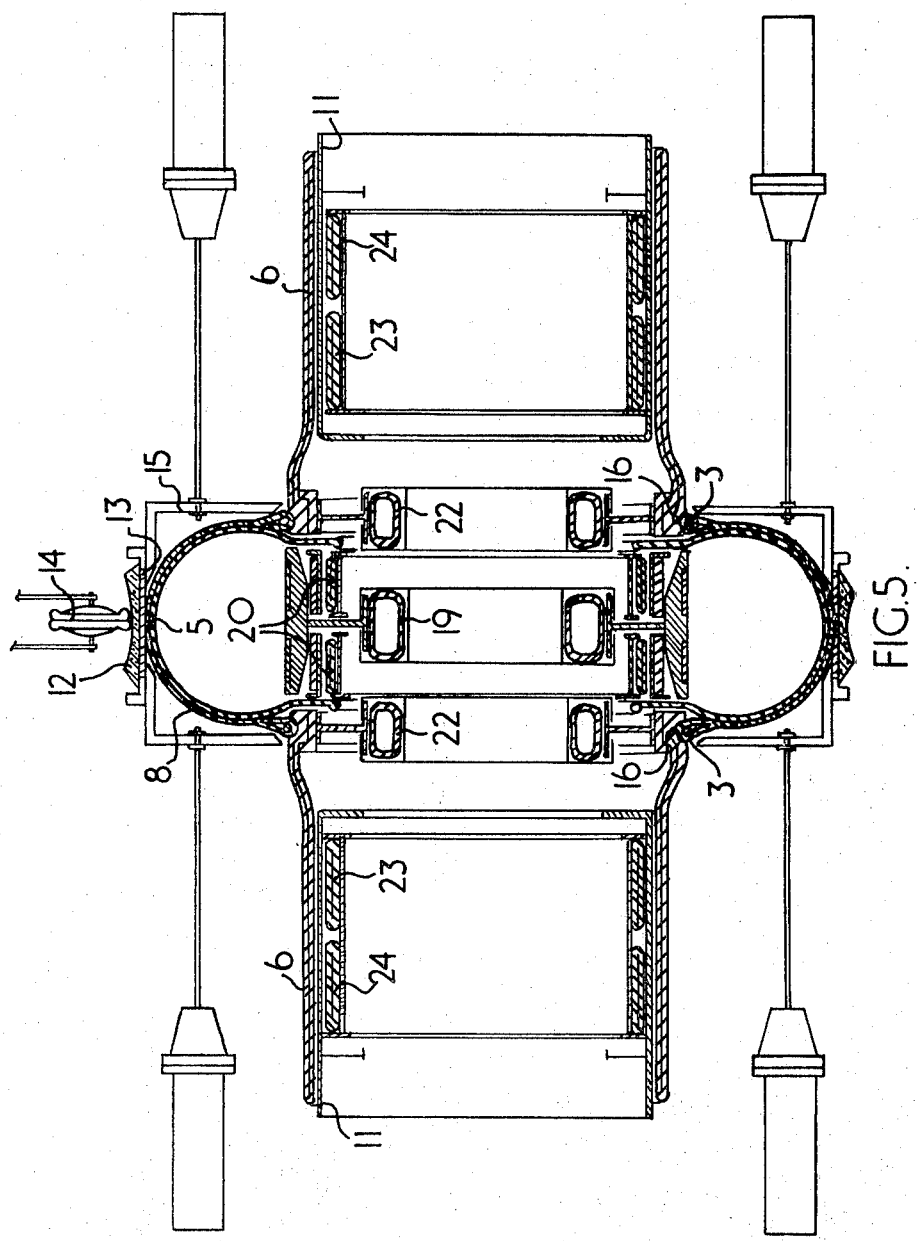
FIG. 5 shows a diagrammatic representation of the building drum in accordance with FIG. 1 during the rolling-on of breaker and tread.

The way in which the building method proceeds after termination of the manufacturing step shown in FIG. 4 depends on whether a single-stage or two-stage method is being used. In the case of the single-stage mode of operation, the diameter limitation imposed on the carcass by the band 7 can be abolished after the fastening of the carcass ply ends to the sidewalls and it is then possible as shown in FIG. 5, to proceed with the rolling-on of a breaker 13 and tread 12. Indicated diagrammatically in FIG. 5 are the bell 15 on which the breaker and tread are supported for this purpose and the stitching device 14.

In the case of a two-stage mode of operation, a substantial advantage is initially achieved in that the shaping of the radial carcass and the subsequent folding-over of the carcass ply ends about the bead cores is effected in the first build-up stage and it is consequently possible to make the cycle time of the first building stage substantially equal to the cycle time of the second building stage. This has an extremely advantageous effect with regard to a continuous production.

Furthermore, in the case of a two-stage building process, the annular band 7 may be used both in the conveying of the carcass from the first building stage to the second building stage and in the positioning of the carcass in the second building stage. The precise positioning in the second building stage is substantially facilitated by the annular band, since this band always assumes a quite specific position on the carcass and the carcass enclosed by the annular band represents a stable body which can thus be easily and exactly positioned.

The annular band can, of course, be provided with special centering and even retaining members, so as to facilitate, rapid axial alignment of the carcass, coming from the first building stage, on the inflating drum of the second building stage, and, to simplify transportation of the carcass between the two building stages.

In this specification considerable reference has been made to "carcass ply ends". It will be appreciated that in some radial ply tire constructions the actual turned up ends of the carcass ply are relatively short but overlapped and extended by further strips of fabric sometimes referred to as ply-extension strips. The present invention may be utilized with such constructions the carcass ply ends in this context being effectively the free ends of the ply extensions.

Having now described our invention, what we claim is:

1. A method for building up a radial-ply tire comprising the steps of arranging a radial carcass ply pocket in a hollow-cylindrical disposition, positioning a pair of bead cores in a mutually spaced relation radially outward of said carcass ply pocket, shaping the carcass ply region situated between the spaced bead cores into a toroid while simultaneously reducing said mutual spacing between said beads, limiting the radial expansion of the carcass to a smaller diameter compared to its final diameter thereby providing lateral bulges in the carcass sidewalls, turning-over the carcass ply ends about the bead cores, and fastening the carcass ply ends which are turned over the bead cores to the bulged-out carcass sidewalls, and subsequently releasing the diameter limitation on the carcass.

2. A method as claimed in claim 1, wherein the step of limiting the radial expansion of the carcass is performed to provide a diameter which is a function of the desired size of the acute angle between the bulged-out carcass sidewall and the carcass ply ends which are to be folded over.

3. A method as claimed in claim 1, wherein the length of the line which limits the cross-sectional area of the carcass torus lying in one plane with the axis of rotation of the carcass is the same, after abolition of the diameter limitation, as in the case of limited diameter and bulged-out sidewall.

4. A method as claimed in claim 1 in which the spacing between the bead cores immediately prior to the folding-over of the carcass ply ends is selected substantially equal to the bead core spacing after mounting of the tire on a vehicle rim.

5. A method as claimed in claim 1 in which the building of the radial ply tire is effected in a single-stage location wherein after said step of releasing the diameter limitation of the carcass toroid, the step of applying tread to the carcass is performed at the said location.

6. A method as claimed in claim 1 in which the building of the radial ply tire is effected in a two-stage process wherein the carcass is conveyed from the first to the second build-up stage after the folding-over and fastening of the carcass ply ends.

7. A method as claimed in claim 6 in which the step of releasing the diameter limitation of the carcass toroid is performed only in the second building stage.

8. Apparatus for carrying out the method as claimed in claim 1, comprising an expansible building drum having means for positioning bead cores on a carcass ply pocket, an inflatable bag or diaphragm for shaping the carcass ply region situated between the bead cores into a toroid, means for folding-over the carcass ply ends about the bead cores, and an annular band which serves to limit the diameter of the carcass toroid during shaping and which is arranged concentric to the center axis of the building drum and symmetrically about the peripheral center line of the build-up drum.

9. Apparatus as claimed in claim 8, in which the annular band consists of at least two parts which are separable in a radial direction, wherein said two parts can be assembled concentrically of the drum and then releasably coupled together.

10. Apparatus as claimed in claim 8 in which the annular band is provided on the outer circumference with members for retaining and centering the band circumferentially of the tire carcass.

11. Apparatus as claimed in claim 8 in which the axial width of the annular band is smaller than the mutual spacing of the edges of the two folded-over carcass ply ends of a tire being built on the apparatus.

12. Apparatus as claimed in claim 8 in which the means for positioning of the bead cores consists of a pair of annular bead support members each having a groove therein to receive a bead, the diameter of said members being variable between the diameter of the unexpanded drum and a greater diamter, and said members being movable in the axial direction of the building drum.

13. Apparatus as claimed in claim 12 in which the device for folding-over the carcass ply ends comprises a pair of inflatable bags which are connected respectively with the annular bead support members.

14. Apparatus as claimed in claim 13 in which each said inflatable bag rests at least partly on a support region of the drum outer surface which support region is capable of being conically expanded.

* * * * *